United States Patent [19]

Pramberger

[11] 3,942,403

[45] Mar. 9, 1976

[54] BUSHING FOR PIANO ACTION

[75] Inventor: Joseph J. Pramberger, Albertson, N.Y.

[73] Assignee: Steinway & Sons, Long Island City, N.Y.

[22] Filed: Feb. 18, 1975

[21] Appl. No.: 550,343

[52] U.S. Cl. .................... 84/251; 308/72; 308/238; 84/452 P

[51] Int. Cl.$^2$ ...................... G10C 3/18; F16C 27/00

[58] Field of Search ............ 84/452 P, 251; 308/72, 308/238

[56] References Cited

UNITED STATES PATENTS

| | | | |
|---|---|---|---|
| 3,240,095 | 3/1966 | Steinway | 84/251 |
| 3,317,255 | 5/1967 | Wehlau | 84/251 X |

FOREIGN PATENTS OR APPLICATIONS

| | | | |
|---|---|---|---|
| 924,263 | 4/1963 | United Kingdom | 84/251 |

*Primary Examiner*—John F. Gonzales
*Attorney, Agent, or Firm*—Spencer E. Olson

[57] ABSTRACT

For use in the pivotal connections of wooden members in a piano action, a bushing formed of a suitable plastic or elastomeric material, such as Teflon, is inserted in bushing holes in each arm of a forked action member for supporting a bearing pin secured to the tongue portion of a mating action member. The bushing has an internal bore of substantially uniform diameter throughout its length, and an outer diameter at the end portions of that portion received in the bushing hole smaller than the outer diameter over the portion thereof mediate the end portions, whereby the bushing can rotate along its axis relative to the bushing hole so as to be self-aligning with the bearing pin received in the internal bore. Because of the "barrel shape" of the bushing, variations in the tolerance on the size of the bushing holes are taken up by compression, causing a slight reduction in the diameter of the internal bore and thereby providing a low-friction essentially line contact between the bushing and the bearing pin. Thus, the bushing is tightly held in the bushing hole, yet the center works freely, despite distortion of the wood parts when subjected to extreme climatic conditions.

3 Claims, 4 Drawing Figures

BUSHING FOR PIANO ACTION

BACKGROUND OF THE INVENTION

This invention relates to bearings, and more particularly, to bearings between parts made of wood or equivalent materials subject to swell and shrink due to changes in atmospheric conditions. The invention has particular utility in connection with the pivotal connections in a piano action, that is, the centers on which the action members swing back and forth, and will be described and illustrated in that context.

A piano action consists of a series of levers, usually made of wood, which are pinned together at certain hinge points known as "centers". These connections are usually effected with tongue-and-fork arrangement held together by means of a lateral or transverse pin. These pins are generally of "German silver" with considerable nickel content so that they will not corrode, and are manufactured with precise tolerances on diameter and concentricity. The pin is held firmly in the central or tongue member, as the hole is drilled for an interference fit. The fork member turns relative to the pin and is provided with a bushing with a view toward achieving a noiseless, efficient and durable action.

The bushing has for many years been made of bushing cloth, a special all-wool felted fabric especially designed and manufactured for this purpose. It has resilience and softness sufficient to eliminate noises, and to absorb impacts in order to eliminate failure of the action parts through fracture and to maintain accurate alignment of the parts. However, this material is hygroscopic, tending to swell in moist atmospheric conditions and to shrink in dry conditions. Consequently, under moist conditions the center often becomes so tight as to interfere with the functioning of the pivotal connection and the corresponding piano key either loses all speed and sensitivity of action or fails to function entirely. A common "fix" for malfunctions due to tightening of the center because of high humidity is the application of a drop of light oil, or an alcohol and water mix, which usually relieves the pivot only temporarily in that it tends to tighten up again with continued exposure to moist conditions. Conversely, with dry conditions the centers occasionally become too loose, resulting in rattles in the action and inaccuracy in the alignment of parts, with consequent loss of power and control in the so-called "touch qualities" of the action.

Other shortcomings of the use of bushing cloth are the inconvenience involved in inserting it in the small holes in the fork members, the necessity for glueing or otherwise securing it to the fork members, and the rather frequent requirement that they be re-glued when, after a period of use, the original glue dries out and the bushing tends to work itself out of the hole in the fork arm. Also, the glue has a tendency to penetrate through the bushing cloth, causing noisy centers.

These costly disadvantages have been eliminated to a considerable extent by providing between the mating action parts a one-piece bushing of suitable plastic or elastomeric material, such as a fluorocarbon resin of the type marketed under the name "Teflon, " as described in U.S. Pat. No. 3,240,095, assigned to the assignee of the present application. The bushing described therein is provided with an integral annular flange at one end, which is positioned on the internal or tongue side of each arm of the fork member. The bushing is inserted from the inside into a bushing hole of correct size to afford a light push fit so as to eliminate any possible distortion of the internal diameter. The flange prevents any possible movement of the bushing outwardly, and, with proper fit, no movement whatsoever, either rotary or inwardly toward the tongue member can occur. The design of the bushing eliminates the necessity for glueing it in place thereby removing the risk of loose and consequently noisy and inaccurate bushings, and of glue-soaked bushings and of bushings uneven in their action because of uneven distribution of glue. The flange also stiffens the bushing and also acts as a spacer to provide the necessary clearance between the mating parts.

Although the bushing described in the aforementioned patent performs admirably when the bushing holes in the fork arms are accurately aligned, the mating parts accurately sized, and the bushing pin and the internal bore of the bushing are sized relative to each other to provide the proper interference fit, and indeed, these conditions have been achieved sufficiently well that bushings of the design described in the patent have been used in preference to bushing cloth for about ten years in the pianos manufactured by applicant's assignee. However, this long-term experience with the patented bushing has demonstrated that it is not without fault. For example, in spite of observance of usual care in the fabrication of the wooden parts of the piano action, the drilled holes in the two fork arms are not perfectly aligned with each other, or may be misaligned with the drilled pin-receiving hole in the tongue part, with the consequence that the internal bores of the two bushings, when inserted with a push fit in the drilled holes in the fork arms, are likewise misaligned with the bearing pin, thus causing the pin to bind in the bushing and not rotate with the desired ease. This problem is compounded by the sizing of the bushings relative to the size of the holes in the fork arms to afford a light push fit, so as to eliminate any possible distortion of the internal diameter of the bushing and to increase the effective length of the contact between the bearing pin and the internal bore of the bushing. Also, it has been found that, contrary to the thinking expressed in the patent that the clearance between mating parts could be reduced to zero, or even operated under compression (by virtue of the low friction of Teflon), it has been found in practice that when the clearance is reduced to this degree the center does not work freely when the wood parts are distorted by extreme conditions of moisture and/or temperature. It has been found, also, that when the bushings are manufactured to a tolerance slightly less than 0.001 inch, as taught in the patent, variations in diameter between bushings become sufficiently significant that sizing or reaming, both during manufacture and in the field, is often necessary to cause the center to work with the correct freedom; obviously, this contributes to the cost of manufacture of the piano as well as to the cost of servicing and maintenance.

It is an object of this invention to eliminate these costly disadvantages of the currently used one-piece Teflon bushing through the provision between the mating action parts of an improved one-piece bushing.

SUMMARY OF THE INVENTION

In accordance with this invention, the bushing, formed of a suitable plastic or elastomeric material, such as Teflon, has at one end an integral annular flange which is positioned on the internal or tongue side of each arm of the fork member, the bushing being inserted from the inside into a bushing hole seized to provide a press fit. The bushing has an internal bore of substantially uniform diameter throughout its length, and an outer diameter at the end portions of that portion received in the bushing hole smaller than its outer diameter over the portion thereof mediate the end portions, whereby the bushing can rotate along its axis relative to the bushing hole so as to be self-aligning with the bearing pin received in the internal bore. In a preferred embodiment, the radius of the portion mediate the end portions varies along its length in accordance with the arc of a circle of predetermined radius centered on the axis of the internal bore. Variations in the tolerance of the bushing holes are taken up by compression of the bushing at its larger diameter region, this compression, in turn, causing a slight reduction in the diameter of the internal bore at the point of compression thereby to provide essentially a line contact between the bushing and bearing pin instead of contact throughout the length of the bushing. Thus, the bushing is tightly held in the bushing hole, yet the center works freely, primarily because of improved alignment and reduction of the length of the pin and bushing contact, despite distortion of the wood parts caused by extreme climatic conditions. The surface of the flange which engages the inner surface of the fork arm is inclined outwardly to provide clearance between the flange and the fork arm to allow the bushing sleeve to be rotated along its axis, and its surface which confronts the tongue portion is chamfered at its outer periphery and at the internal bore for reducing the area of contact of the annular flange with the tongue portion to reduce the friction between the opposed surfaces of the tongue portion and the flange.

BRIEF DESCRIPTION OF THE DRAWINGS

Other objects, features and advantages of the improved bushing will become apparent from the following detailed description, taken in conjunction with the accompanying drawings, in which.

DESCRIPTION OF THE PREFERRED EMBODIMENT

Figure 1:
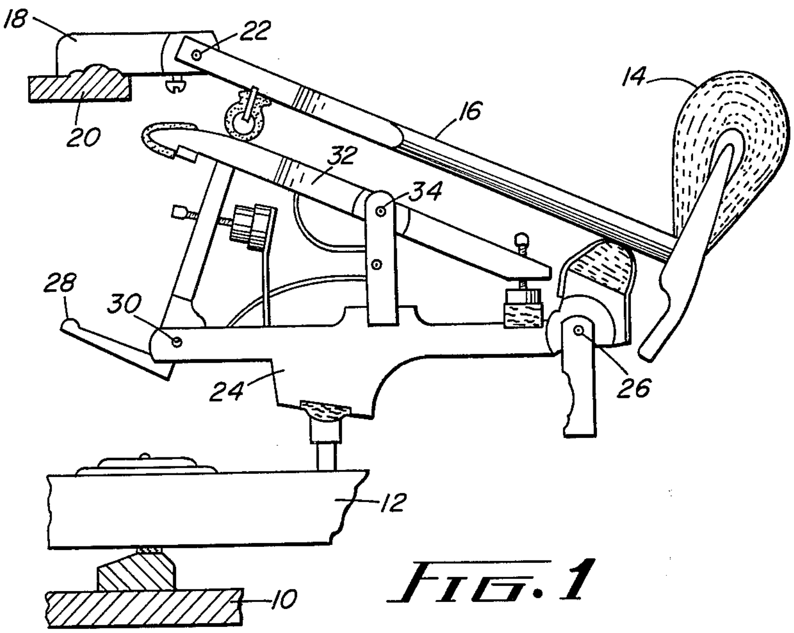
FIG. 1 is a fragmentary section of the front portion of a grand piano showing one key and its hammer action in side elevation to illustrate the hinge points at which the improved bushing is utilized.

The piano construction shown in FIG. 1 is conventional, consisting of a key-frame 10, key 12, hammer 14, hammer shank 16, hammer flange 18, flange rail 20, pivotal connection 22 between the hammer shank and hammer flange, wippen 24, wippen pivot 26, jack fly 28, pivot 30 between wippen and jack fly, repeating lever 32 and pivot 34 between wippen and repeating lever. The improved bushing of this invention is useable to advantage in all of the pivotal connections 22, 26, 30 and 34, which are representative of such connections in actions of both upright and grand pianos. Since the bearings at all of these pivotal connections have the same construction, only the bearing 22 is illustrated in FIG. 2, 3 and 4.

Figure 2:
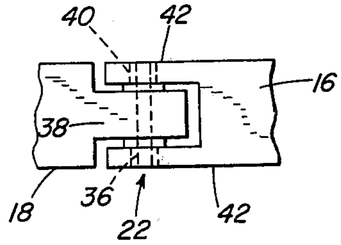
FIG. 2 is a fragmentary plan view on a larger scale of the forked end of the hammer shank and its flange of FIG. 1, connected by the improved bearing of this invention.
Figure 4:
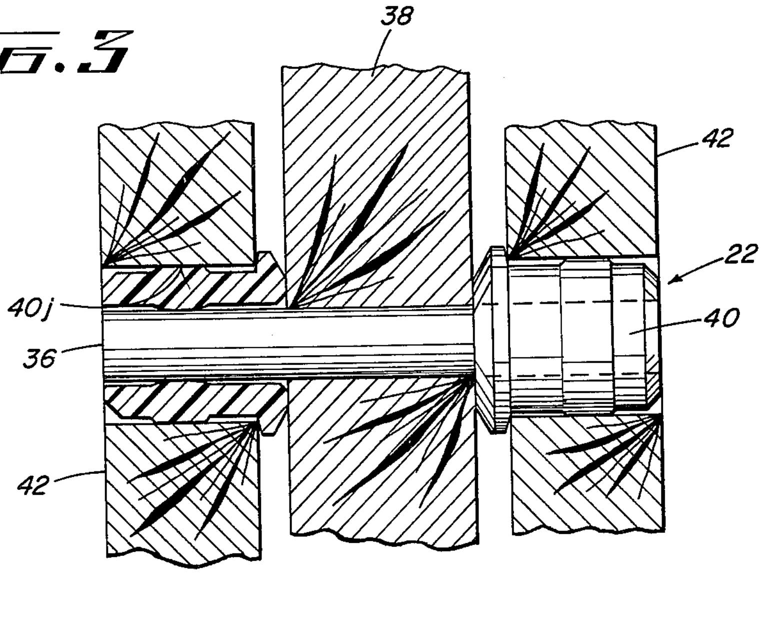
FIG. 4 is a fragmentary view partly in section and on the scale of FIG. 3 of the bearing of FIG. 2 illustrating the configuration and arrangement of the bearing bushings.

As seen in FIGS. 2 and 4, the bearing 22 comprises a cylindrical metal pin 36, usually formed of "German silver," having a tight or driven fit with a hole extending laterally through the tongue portion 38 of the wooden hammer flange 18, both ends of the pin projecting beyond the sides of the tongues to form trunnions. In the present embodiment, the bearing pin has a diameter of 0.048 inch, plus 0.000 inch and minus 0.0002 inch. These trunnions are surrounded by cylindrical bushings 40 of a suitable plastic or elastomeric material, preferably the fluorocarbon resin sold under the trademark Teflon, retained in holes provided to receive them in the arms 42 of the bifurcated or forked end of the wooden hammer shank 16, which in the present embodiment have a diameter of 0.0097 ± 0.001 inch. Thus, the hammer shank is pivoted to the tongue portion 38 of the hammer flange 18, the bushings 40 turning about the trunnion ends of the bearing pin 36.

Figure 3:
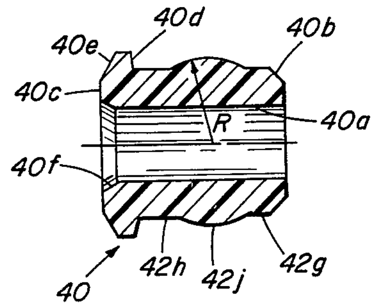
FIG. 3 is a cross-sectional view on a still larger scale of the improved bushing used in the bearing of FIG. 2.

The improved bushing according to the invention, shown ten times actual size in FIGS. 3 and 4, is preferably manufactured on an automatic screw machine, for most accurate results. The present embodiment of the bushing has an overall length of 0.120 ± 0.003 inch and an internal bore 40*a* of uniform diameter throughout its length of 0.049 ± 0.0005 inch. The outer end of the bushing is chamfered at 40*b* to facilitate insertion in the bushing holes in the arms of the forked hammer shank.

The inner end of the bushing is provided with an integral flange 40*c* which engages the inner surface of the fork arm and acts as a spacer between the associated arm 42 and the tongue portion 38 of the hammer flange 18, providing the necessary clearance between the mating parts. The surface 40*d* of the flange which confronts the fork arm is inclined outwardly by a small amount, typically 8° from the vertical, to provide clearance between the flange and the fork arm for a purpose to be discussed presently. The inner end of the bushing is chamfered at its outer periphery as at 40*e*, and around the internal bore, as at 40*f*, so as to reduce the area of contact of the flange with the confronting tongue portion thereby to reduce the friction between opposed surfaces of the tongue portion and the associated flanges. For example, a 30° chamfer at both the outer periphery of a flange 42*c* having a diameter of 0.120 inch and at the internal bore of diameter 0.049 inch reduces by 60% the area of the flange which contacts the tongue portion, with a corresponding reduction in the friction between the tongue and the associated flanges.

An important feature of the improved bushing is that the outer diameter of the portions 40*g* and 40*h* of that portion of the bushing that is received in the bushing hole is smaller than the diameter of the portion 40*j* mediate the end portions. In this embodiment, the maximum outer diameter of the portion 40*j* is larger by 0.008 inch than the diameter of the end portions 42*g* and 42*h* and varies in accordance with the arc of a circle having a radius of 0.051 inch, centered on the axis of the bushing and inwardly 0.070 inch from the outer surface of the flange. The resulting "barrel-shape" over a portion of the length, which is closer to the inner end of the bushing than it is to the flange, reduces the area of engagement between the bushing and the bushing hole and allows the bushing to be rotated along its axis relative to the bushing hole so as to be self-aligning with the bearing pin regardless of misalignment of the bushing holes in the respective fork arms. It will now be appreciated that the inclination of the surface 40*d* of the flange is necessary to allow rotation of the bushing along its axis after it is seated in the bushing hole.

The bushings, which have a maximum outer diameter of 0.102 ± 0.0005 inch, are inserted from between the arms 42 into the bushing holes, which as was noted earlier, have a diameter of 0.097 ± 0.001 inch, thereby to provide a press fit. Another important advantage of the "barrel shape" is that variations in tolerances on the size of the bushing hole and on the maximum outer diameter of the bushing are taken up by compression of the bushing in the region 40*j*, which results in a decrease in the diameter of the internal bore 40*a* in the portion of its length corresponding to the region 40*j* as shown, exaggerated, in the left-hand bushing in FIG. 4. The result is that the bushing is tight in the fork member in which it is inserted, yet the pin 36 is free to rotate relative to the bushing on the essentially line contact between the pin and the bushing. In manufacture, the variation in internal diameter between bushings can be held to ±0.0005 inch, so that variations become relatively insignificant, and because of the compressibility, sizing or reaming as with bushing cloth or with the bushing of U.S. Pat. No. 3,240,095 is unnecessary, resulting in manufacturing and maintenance economies.

By reason of its hygroscopic and mechanical properties as set forth in U.S. Pat. No. 3,240,095, the bushing is preferably made of a fluorocarbon resin such as polytetrafluoroethylene marketed under the trademark Teflon. In trials of piano actions equipped with the improved bushing in a range of humidity environments from moderate low to moderate high humidities, the percent change in the force necessary to actuate them (i.e., the change in the friction of the action) was negligible; these tests demonstrate that the bushing will remain free-acting but firm in all normal climates, and even under extreme environmental conditions, and afford a reliable and efficient performance. Extensive testing of the improved bushings in concert pianos in almost daily use, and activation of the centers on a testing machine for over 8,000,000 cycles have confirmed their performance. The bushing remains resilient, noiseless, with no side play or rattle, and yet free and solid in movement. Abrasion resistance of the bushing has proved excellent, with no perceptible wear or looseness in use.

Although a bushing having specific dimensions in relation to the size of the bushing hole in which it is received and the diameter of the bearing pin has been described, it will be understood that the advantages of the invention can be realized by appropriately altering either or both of the inner and outer diameters to accomodate to bushing holes and/or bearing pins having diameters other than those specifically described. For example, in others of the "centers" of the piano action of FIG. 1, bearing pins of the same 0.048 $^{+0.0000''}_{-0.0002}$ diameter are used, but the bushing holes in the fork arms have a diameter of 0.129 ± 0.001 inch; for this case, the dimensions of the bushing are as described above except that it has a maximum outer diameter of 0.134 ± 0.0005 inch, its end portions have a diameter of 0.126 ± 0.0005 inch, and the center of arc defining the "barrel-shape" is displaced from the center line of the internal bore by 0.016 inch.

Thus, it will be seen that the self-aligning and compressibility features of the bushing of this invention enables the production of an action center having negligible friction and which is virtually free from maintenance problems. The need for sizing and reaming during manufacture and/or in the field is essentially eliminated. This is of particular advantage because of the difficulty (and the high cost, when available) of obtaining competent service on pianos and the tendency of owners to neglect the need for such servicing. The present bushing provides trouble-free service throughout the life of the instrument.

I claim:

1. A piano action assembly comprising in combination with a bifurcated piano action member having fork arms and a piano having a tongue portion disposed between and in spaced relation to said fork arms to provide opposed surface portions at opposite sides of said tongue portion, a pivotal connection between said tongue portion and said fork arms comprising:

a metal bearing pin traversing and fixedly carried by said tongue portion and projecting from opposite sides of said tongue portion to provide a trunnion end portion at each of said opposite sides, said trunnion end portions each being journalled in and surrounded by a bushing formed of a resilient, inert elastomeric material seated in a bushing hole in the respective fork arms, which bushing holes are normally aligned but subject to slight misalignment, said bushings each having an internal bore of substantially uniform diameter throughout its length within which the corresponding trunnion end portion of the bearing pin is received with an interference fit and an outer diameter at the end portions of that portion of its length that is seated in the bushing hole less than its outer diameter over a portion thereof mediate said end portions, the mediate portion of said bushing being in press fit with its respective bushing hole, said bushings each having an integral annular spacing flange at one end thereof, said flanges being disposed in substantially close-fitting surface engagement with the inner surface of its respective fork arm and disposed at opposite sides of said tongue portion between said tongue portion and said fork arms, the surface of the flange which engages the inner surface of the fork arm being inclined outwardly from the surface of the fork arm sufficiently to provide clearance between the flange and the fork arm to allow the bushing to be rotated along its axis about the larger outer diameter portion thereof to effect alignment of the internal bore thereof with the bearing pin whereby the bushings are self-aligning with the bearing pin and with each other regardless of misalignment of the bushing holes in the respective fork arms.

2. A piano action assembly in accordance with claim 1 in which the surface of the flange which confronts said tongue portion is chamfered at its outer periphery and around the internal bore for reducing the area of contact thereof with said tongue portion thereby to reduce the friction between opposed surfaces of said tongue portion and the associated flanges.

3. A piano action assembly in accordance with claim 1 in which the outer radius of the mediate portion of the bushing varies along its length in accordance with the arc of a circle of predetermined radius, and said end portions have substantially equal uniform diameters throughout their respective lengths.

* * * * *